United States Patent
Jain et al.

(10) Patent No.: US 11,989,573 B2
(45) Date of Patent: May 21, 2024

(54) ADAPTIVE VIRTUAL FUNCTION DRIVERS FOR ELECTRONIC DEVICES

(71) Applicant: INTEL CORPORATION, Santa Clara, CA (US)

(72) Inventors: Anjali Singhai Jain, Portland, OR (US); Mitu Aggarwal, Portland, OR (US); Parthasarathy Sarangam, Portland, OR (US); Donald Wood, Austin, TX (US); Jesse Brandeburg, Portland, OR (US); Mitchell A. Williams, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 18/204,643

(22) Filed: Jun. 1, 2023

(65) Prior Publication Data
US 2024/0036895 A1 Feb. 1, 2024

Related U.S. Application Data

(63) Continuation of application No. 17/159,572, filed on Jan. 27, 2021, now Pat. No. 11,698,804, which is a continuation of application No. 15/942,152, filed on Mar. 30, 2018, now Pat. No. 10,970,099.

(60) Provisional application No. 62/513,625, filed on Jun. 1, 2017.

(51) Int. Cl.
*G06F 9/455* (2018.01)
*G06F 8/61* (2018.01)
*G06F 13/10* (2006.01)

(52) U.S. Cl.
CPC ............ *G06F 9/45537* (2013.01); *G06F 8/63* (2013.01); *G06F 13/102* (2013.01); *G06F 9/45558* (2013.01)

(58) Field of Classification Search
CPC ...... G06F 9/45537; G06F 8/63; G06F 13/102; G06F 9/45558
See application file for complete search history.

(56) References Cited

PUBLICATIONS

Jain et al., Network I/O virtualization and its future (Year: 2017).*
Zhang et al., Intel 25GBE advanced features for NFV (Year: 2017).*

* cited by examiner

*Primary Examiner* — Sisley N Kim
(74) *Attorney, Agent, or Firm* — KDW Firm PLLC

(57) ABSTRACT

Techniques for providing adaptive virtual function (VF) drivers capable of operating with physical devices having a plurality of different hardware configurations are described. In one embodiment, for example, an apparatus may include logic to implement a virtual machine (VM), the logic to initialize an adaptive virtual function (VF) driver to facilitate communication between the VM and a physical device to be virtualized, establish communication between the adaptive VF driver and a physical function (PF) driver of the hypervisor for the physical device, activate a standard feature set for the adaptive VF driver to execute on a PF of the physical device, and negotiate activation of an advanced feature set for the adaptive VF driver to execute on the PF, the adaptive VF driver to provide the advanced feature set to the PF, the PF activate each feature of the advanced feature set supported by the PF.

20 Claims, 7 Drawing Sheets

ADAPTIVE VIRTUAL FUNCTION DRIVERS FOR ELECTRONIC DEVICES

CROSS-REFERENCE TO RELATED APPLICATIONS

This application is a continuation of, claims the benefit of and priority to previously filed U.S. patent application Ser. No. 17/159,572 filed Jan. 27, 2021, entitled "ADAPTIVE VIRTUAL FUNCTION DRIVERS FOR ELECTRONIC DEVICES", which is a continuation of, claims the benefit of and priority to previously filed U.S. patent application Ser. No. 15/942,152 filed Mar. 30, 2018, entitled "ADAPTIVE VIRTUAL FUNCTION DRIVERS FOR ELECTRONIC DEVICES", which claims the benefit of and priority to previously filed U.S. Provisional Patent Application Ser. No. 62/513,625 filed Jun. 1, 2017, entitled "Adaptive Virtual Function Driver for Electronic Devices", which are hereby incorporated by reference in their entireties.

TECHNICAL FIELD

Embodiments herein generally relate to information processing and, more specifically, but not exclusively, to techniques for management of adaptive virtual function drivers in a virtualization computing environment.

BACKGROUND

Advancements in networking have enabled the rise in pools of configurable computing resources. These pooled configurable computing resources may be formed from a physical infrastructure including disaggregate physical computing resources, such as, for example, large data centers. The physical infrastructure can include a number of computing systems having processors, memory, storage, networking, power, cooling, etc. Management entities of these data centers may provision computing resources to a computing entity (for example, containers, virtual machines (VMs), or the like) to allocate portions of the pool of configurable computing resources to support, implement, execute or run a workload, such as, an application within the virtual computing entity.

Various types of applications or application workloads may utilize this allocated infrastructure in a shared manner, for example, via virtualization of resources. In general, virtualization involves the use of computer software and hardware to emulate or otherwise implement the functions or features of a physical computing device to allow, among other things, sharing of physical computing resources. For example, multiple virtual machines (VMs) can run concurrently on the same physical computing system. In the context of input-output (I/O) devices, virtualization technologies can be used to allow multiple VMs to share the same I/O hardware resources

DETAILED DESCRIPTION

Figure 1:
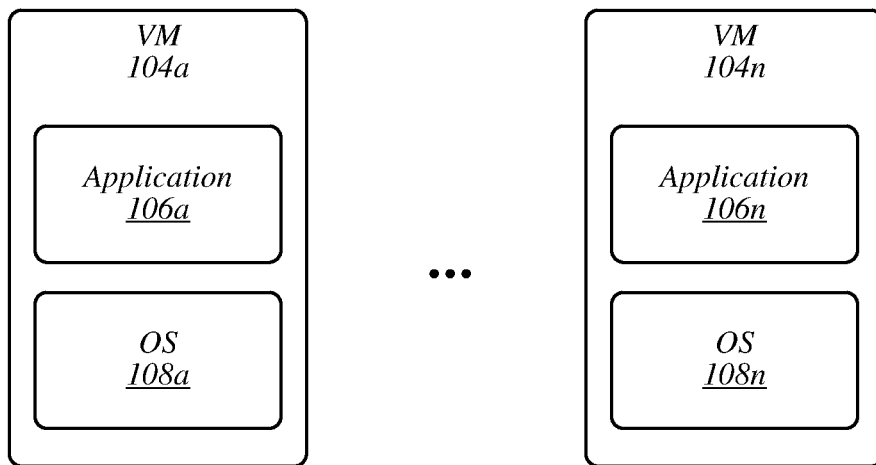
FIG. 1 illustrates an embodiment of a first operating environment.
Figure 1:
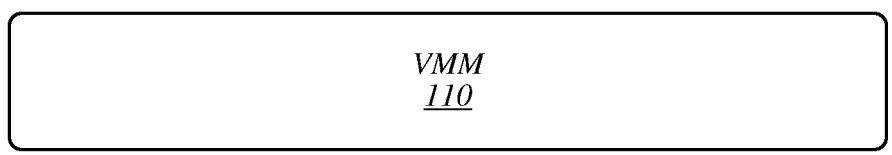
Figure 1:
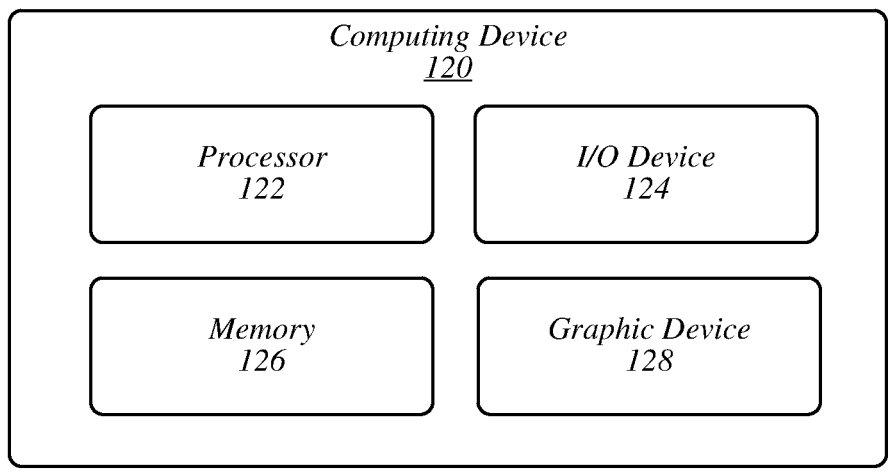

Various embodiments may generally be directed toward systems and techniques for configuring, deploying, or otherwise managing domains and/or containers within a virtualized computing environment. Domains and/or containers may include virtual machines (VMs) and/or components thereof, such as drivers. In some embodiments, VMs may be operative to include adaptive components, such as adaptive drivers operative to be forward compatible with virtualized hardware resources.

Data centers may generally be composed of a large number of racks that contain numerous types of hardware or configurable computing resources. For example, the racks can contain central processing units (CPUs), graphics processing units (GPUs), memory, storage, networking, fans/cooling modules, power units, or the like. The types of hardware or configurable computing resources deployed in data centers may also be referred to as disaggregate physical elements. The size and number of computing resources and the disaggregation of these resources presents countless combinations of computing resources that can be configured to fulfill workloads. Also, the types of workloads may have different characteristics that may require a different mix of computing resources to efficiently fulfill a given type of workload.

Deploying, supporting, configuring, maintaining and provisioning such pools of configurable computing resources can be a challenge. One challenge in particular concerns hardware-supported virtual functions, such as single root input/output (I/O) virtualization (SR-IOV) functions, among others. By way of example, the SR-My interface is an extension to the PCI Express (PCIe) specification. SR-IOV allows a device, such as a network adapter, to separate or partition access to its resources among various PCIe hardware functions. These functions may include, for example, a PCIe Physical Function (PF). The PCIe PF is a primary function of a device and advertises the device's SR-IOV capabilities. In some embodiments, a PCIe PF may be associated with a hypervisor or virtual machine manager (VMM) (for instance, Hyper-V parent partition) in a virtualized environment. Another PCIe hardware function may include one or more PCIe Virtual Functions (VFs). In various embodiments, a VF may be associated with a device's PF. A VF may share one or more physical resources of the device, such as a memory and a network port, with the PF and other VFs on the device. In some embodiments, a VF may be associated with a VMM (for instance, Hyper-V child partition) in a virtualized environment.

Each PF and VF may be assigned a unique PCI Express Requester ID (RID) that allows an I/O memory management unit (IOMMU) to differentiate between different traffic streams and apply memory and interrupt translations between the PF and VFs. This allows traffic streams to be delivered directly to the appropriate VMM (for instance, Hyper-V parent or child partition). As a result, nonprivileged data traffic flows from the PF to VF without affecting other VFs.

SR-IOV enables network traffic to bypass the software switch layer of the VMM (or Hyper-V) virtualization stack. Because the VF is assigned to a child partition, the network traffic flows directly between the VF and child partition. As a result, the I/O overhead in the software emulation layer is diminished and achieves network performance that is nearly the same performance as in nonvirtualized environments.

One problem associated with hardware supported virtual functions (e.g. SR-IOV virtual functions), is that the virtual functions are directly assigned to a particular virtual machine (VM). Furthermore, each VM and/or VF is typically specific to a hardware implementation and also to the hardware PF. As such, every change in a given hardware platform for a VM may necessitate a change in one or more network virtual function drivers associated with the VM.

For instance, cloud service providers may have thousands of VMs running in a data center. These VMs typically run a fixed set of operating system (OS) images or OS image is brought in by the customers or tenants. Cloud service providers periodically upgrade the servers, networks, and/or components thereof. If the device drivers in the VMs are tied to specific hardware, then upgrading hardware could mean updating the virtual function drivers in each of the VMs. This makes the upgrade process cumbersome, inefficient, and costly for the service provider. When creating VMs, it would be ideal for the cloud vendors to create a hardware agnostic image and be able to install this image on any system, even those with a newer I/O device in them. Accordingly, some embodiments provides a virtual function driver that does not need to be updated when the underlying hardware is changed, unless, for instance, a vendor or other entity would like to use the new features supported by the new hardware.

FIG. 1 illustrates an example of an operating environment 100 that may be representative of some embodiments. As shown in FIG. 1, operating environment 100 may include a virtualized computing environment having a computing device 120, for instance, implemented as processor-based platform configured to execute a VMM 110. Although implemented in software, VMM 110 may emulate and export a virtual machine interface to higher level software. Such higher level software may comprise a standard OS, a real time OS, or may be a stripped-down environment with limited OS functionality and may not include OS facilities available in a standard OS in some embodiments. Alternatively, for example, the VMM 110 may be run within, or using the services of, another VMM. VMMs may be implemented, for example, in hardware, software, firmware, and/or any combination thereof. In at least one embodiment, one or more components of the VMM 110 may execute in one or more virtual machines and one or more components of the VMM 110 may execute on the platform hardware as depicted in FIG. 1. The components of the VMM 110 executing directly on the platform may be referred to as host components of the VMM 110. In another embodiment, examples of VMM 110 may comprise a hybrid virtual machine monitor, a host virtual machine monitor, or a hypervisor virtual machine monitor.

The computing device 120 may include various logic devices. Non-limiting examples of computing devices 120 may include a personal computer (PC), a server, a mainframe, a handheld device such as a personal digital assistant (PDA), a tablet, a smart phone or any other smart devices, an Internet Protocol device, a digital camera, a portable computer, a handheld PC such as netbook or notebook, an embedded applications device such as a micro controller, a digital signal processor (DSP), a system on a chip (SoC), a network computer (NetPC), a set-top box, a network hub, a wide area network (WAN) switch, another processor-based system, and/or any combination thereof. Embodiments are not limited in this context.

Computing device 120 may include at least a processor 122 and memory 126. Processor 122 may be any type of processor capable of executing programs, such as a microprocessor, digital signal processor, microcontroller, and/or the like. Processor 122 may include microcode, programmable logic or hard coded logic for execution in embodiments. Although FIG. 1 shows only one such processor 122, computing device 120 may include a plurality of processors 122. Additionally, processor 122 may include multiple cores, support for multiple threads, and/or the like. Processor 122 may include microcode, programmable logic or hard-coded logic to perform operations associated with various embodiments described herein.

Memory 126 may comprise a hard disk, a floppy disk, random access memory (RAM), read only memory (ROM), flash memory, any other type of volatile memory devices or non-volatile memory devices, or combination of the above devices, or any other type of machine medium readable by processor 122 in various embodiments. Memory 126 may store instructions and/or data for performing program execution and other method embodiments. In some embodiments, some embodiments may be implemented in other system components, for example, in the platform chipset or in the system's one or more memory controllers.

VMM 110 may present to guest software an abstraction of one or more VMs 104a-n. VMM 110 may present the same or different abstractions of physical platform to different VMs 104a-n. Guest software, such as guest software running on each of VM 104a-n, may include a guest OS such as a guest OSs 108a-n and various guest software applications 106a-n. Guest software may access physical resources (for instance, processor registers, memory, and I/O devices) within the VMs 104a-n on which guest software is running and may perform various other functions. For example, guest software may have access to some or all registers, caches, structures, I/O devices, memory and/or the like, according to the architecture of the processor and platform presented in VMs 104a-n.

In one embodiment, processor 122 may control the operation of VMs 104a-n. In one embodiment, in response to a VM 104a-n referencing a memory location in its virtual address space, a reference to an actual address in the physical memory of the host machine 120 (machine physical memory) may be generated by memory management module (not shown) in VMM 110, which may be implemented in hardware (sometimes incorporated into processor 122) and software (for example, in the operating system of the host machine). In the embodiment of FIG. 1, computing device 120 may include one or more I/O devices 124. Computing device 120 may include one or more graphic control devices 128 that may be used to perform one or more graphics functions.

Figure 2:
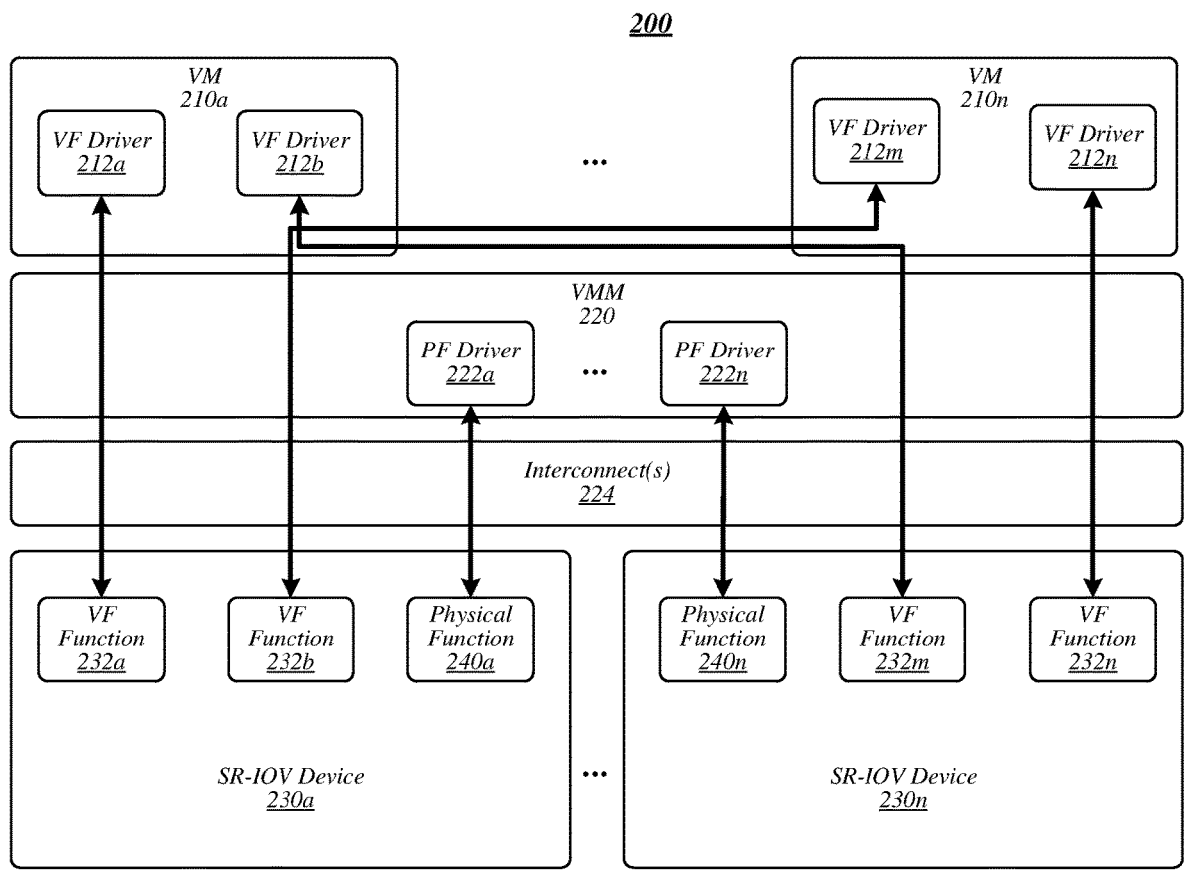
FIG. 2 illustrates an embodiment of a second operating environment.

FIG. 2 illustrates an example of an operating environment 200 such as may be representative of some embodiments. More specifically, operating environment 200 may include a VM environment implemented using an SR-My architecture. As shown in FIG. 2, operating environment 200 may include VMs 210a-n, a VMM 220, and an SR-IOV devices 230a-n. Each of VMs 210a-n may include at least one VF driver 212a-212n that interact with respective virtual functions 232a-232n that are implemented, for instance, in SR-IOV devices 230a-n. In some embodiments, at least a portion of VF drivers 212a-n may include adaptive VF drivers. Physical functions (PF) may be implemented using PF drivers 222a-n in VMM 220, which interact with PFs 240a-n in SR-IOV devices 230a-n. Communication between the various components is facilitated by interconnects 224.

In some embodiments, the SR-IOV architecture of operating environment 200 may enable traffic to be forwarded between VMs 210a-n without using an external switch.

Various systems, such as accelerators and high-performance I/O devices, may be virtualized using an SR-IOV architecture, such as the architecture depicted in FIG. 2. In general, SR-IOV may specify that the device may include a single PF 240a-n and multiple VFs 232a-n, such that each VF 232a-n can be assigned to a VM 210a-n directly. A VF 232a-n may appear as a virtual I/O device to the VM 210a-n. VF driver 212a-n in VM 210a-n may directly access VF 232a-n MMIO space without VMM 220 involvement. VF drivers 212a-n may directly submit work to respective VFs 232a-n and the device may process the work from various VFs 232a-n (or VMs 210a-n) while providing isolation among the various VFs 232a-n. For instance, a VF driver 212a-n may see a real VF 232a-n and all of the VFs 232a-n capabilities.

In some embodiments, VMs 210a-n, VF drivers 212a-n, VMM 220, VF functions 232a-n, PFs 240a-n, SR-IOV devices 230a-n, and/or components thereof may include logic implemented in hardware, software, or a combination thereof. As used in this application, the terms "logic," "component," "layer," "system," "circuitry," "decoder," "encoder," and/or "module" are intended to refer to a computer-related entity, either hardware, a combination of hardware and software, software, or software in execution, examples of which are provided by the exemplary computing architecture 700. For example, a logic, circuitry, or a layer may be and/or may include, but are not limited to, a process running on a processor, a processor, a hard disk drive, multiple storage drives (of optical and/or magnetic storage medium), an object, an executable, a thread of execution, a program, a computer, hardware circuitry, integrated circuits, a controller, application specific integrated circuits (ASIC), programmable logic devices (PLD), digital signal processors (DSP), field programmable gate array (FPGA), a system-on-a-chip (SoC), memory units, logic gates, registers, semiconductor device, chips, microchips, chip sets, software components, programs, applications, firmware, software modules, computer code, combinations of any of the foregoing, and/or the like.

In some embodiments, an adaptive VF driver, such as one or more of VF drivers 212a-n, may be operative to facilitate forward compatibility with hardware and/or software upgrades. For example, some embodiments provide forward compatibility through, among other things, a definition of a set of basic or core features that the adaptive VF driver may always support. To facilitate implementation, a hardware vendor may ensure hardware interfaces remain consistent (for example, forwards and/or backwards) across product families. For example, hardware may be operative according to some embodiments to support a standard feature set for the adaptive VF. The adaptive VF driver may operate the standard feature set that is always available on hardware implementations. In addition, a physical function (PF) driver to which the VF binds may be operative to support an application program interface (API) for feature negotiation. Any advanced features may be negotiated between the adaptive VF driver and an enhanced or legacy PF driver using this feature negotiation API. In some embodiments, the software protocol(s) used to communicate between the VF and PF drivers may be preserved. In various embodiments, hardware constructs that the adaptive VF driver needs to perform read and/or write operations to execute the basic function may be preserved.

Computing devices and components thereof (for example, networking or graphics devices) that support hardware virtualization may facilitate a distinction between configuration operations and run-time operations. In order to preserve forward compatibility, in some embodiments, configuration operations may be performed through the PF driver. For example, in some embodiments, the PF driver may be used as a proxy, rather than allowing an adaptive (or legacy) VF to configure the hardware directly. Runtime fast-path operations exercise the hardware directly from the adaptive VF driver, which may be preserved according to some embodiments.

An adaptive VF driver provides significant technological advantages, features, and effects relative to conventional VF drivers that provides material improvements in computer-related technologies, for instance, that implement virtualized environments. In one non-limiting example of a technological advantage, adaptive VF drivers may provide network function virtualization (NFV) vendors and cloud infrastructure providers with reduced time and cost overhead of upgrading hardware in their environment. In another non-limiting example of a technological advantage, because an adaptive VF driver according to some embodiments enables existing drivers to work on future products, the numerous VMs running in datacenters will not need to be updated for every hardware change. In a further non-limiting example of a technological advantage, adaptive VF drivers according to some embodiments may reduce overhead normally incurred when updating hundreds (or thousands) of VMs. Accordingly, hardware vendors may upgrade hardware more frequently and may allow customers to stick to a particular hardware platform. In a still further non-limiting examples of technological advantages, an adaptive VF driver according to some embodiments may reduce or even eliminate a need to have a separate VF driver for each generation of a device; allow reuse of current VM images for new devices, thereby reducing or eliminating costs associated with purchasing, installing and validating new VM images; and reduce or even eliminate a need to update and verify VM images typically associated with new drivers or driver upgrades. Other technical advantages exist as well.

Illustrative and non-restrictive examples of technologies and/or operating systems suitable for implementation of an adaptive VF driver may include, without limitation, VMs, Linux kernels, kernel VM (KVM), SR-IOV devices, VF drivers, network virtualization function (NVF) drivers, data plane drivers, control plane drivers, VF base mode drivers, an Ethernet Adaptive Virtual Function driver (AVF) made by Intel® Corporation, Santa Clara, California, as well as other compute, I/O, peripheral, hardware, software, validation, OS, and communication technologies. Embodiments are not limited in this context.

Figure 3:
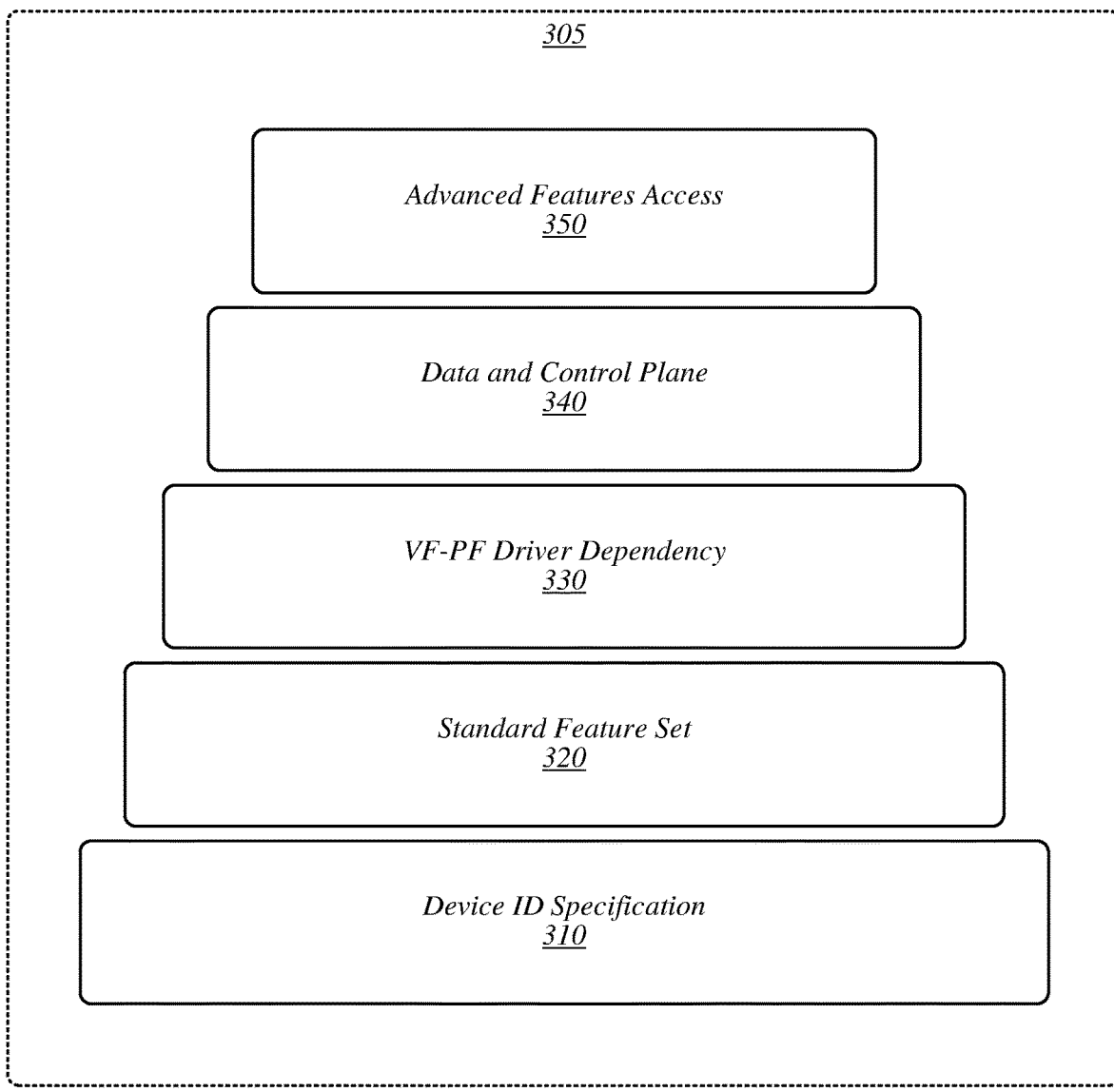
FIG. 3 illustrates an embodiment of an adaptive component hierarchy.

FIG. 3 illustrates an example adaptive component hierarchy to implement an architecture for an adaptive component according to some embodiments. As shown in FIG. 3, an adaptive component hierarchy 305 may include a device ID specification layer 310. In some embodiments, the device ID specification layer may involve specifying a standard device identifier (ID) for virtualized devices. For example, an adaptive VF driver may include a single standard device identifier (ID) for all virtualized devices. Most I/O devices that expose a virtual function device in a VM typically use a unique device ID to identify the type of hardware from which the virtual device is derived (for example, SR-IOV devices 230a-n). In order to facilitate an adaptive VF driver operating on newer hardware from the same vendor, hardware may advertise the same (or similar) virtual function device ID on current and future versions of these devices.

In some embodiments, adaptive component hierarchy 305 may include a standard feature set layer 320. For example, an adaptive VF driver may preserve a defined standard feature set of functionality in a hardware device (for example, SR-IOV devices 230*a-n*) and in software for all virtual devices. In some embodiments, the standard feature set may include a minimum set of features that the adaptive VF driver may support. I/O devices (for example, universal serial bus, graphics, wired and wireless network adapters, etc.) typically support a minimum set of features. For example, an adaptive VF driver for a wired network adapter may require supporting basic receive and transmit queues for data direct memory access (DMA), signaling events to software, basic stateless offloads like checksum, segmentation offload, jumbo frames, RSS, and other features. An adaptive VF driver can also support stateful offloads like remote DMA (RDMA), which may have their own standard feature set of minimum required features. Hardware operative with backward compatibility of an adaptive VF driver may commit to preserving the hardware constructs needed to enable and support the standard feature set. Even if a hardware device is redesigned to expose advanced features (for example, updating queuing formats), the hardware device may continue to support the legacy features (for example, legacy queueing) so that older legacy VF drivers can continue to work on newer hardware. In addition, communication mechanism between an adaptive VF driver and a PF driver may be maintained to enable these features. Accordingly, in some embodiments, an adaptive VF driver may support a standard feature set that corresponds with a standard set of features supported by a hardware device. The hardware device may support advanced features; however, the hardware device may maintain support for the standard feature set to facilitate compatibility with the adaptive VF driver.

In some embodiments, the defined feature set may include, without limitation, checksum offload (for example, an adaptive VF driver may support Internet Protocol Version 4 (IPv4) header checksum generation and TCP/user datagram protocol (UDP) partial checksum generation in hardware for present and future devices); TCP segmentation offload (for example, an adaptive VF driver may support TCP segmentation support for TCP/IPv4/Internet Protocol Version 6 (IPv6) for present and future devices on all its queues); multi-queue device interface (for example, an adaptive VF driver may use multiple transmit and receive queues to reduce internal overhead and to increase scalability, the presence of multiple queues may simplify and accelerate the process of mapping incoming and outgoing packets to a particular virtual central processing unit (vCPU)); receive side scaling (for example, an adaptive VF driver may support spreading incoming flows to load balance across multiple vCPUs for processing using hashing, which may, among other things, reduce bottlenecks and increases cache efficiency). Embodiments are not limited in this context.

In some embodiments, adaptive component hierarchy 305 may include a VF-PF driver dependency layer 330. In some embodiments, a hardware device (for example, SR-IOV devices 230*a-n*) may provide a defined (for example, minimum) direct configuration from the adaptive VF driver into the hardware that cannot be proxied through the PF, such as configuring of the hardware mailbox for communication with the PF, for example. In another example, the hardware device may contain and identify fast path registers and DMA formats for direct DMA access from the adaptive VF driver. In various embodiments, a software component and/or entity may preserve a PF-VF communication protocol definition from one generation of hardware to the next. The base features may be enabled by the PF in all cases when the enhanced VF is enabled. In some embodiments, VF-PF driver dependency layer 330 may include an adaptive VF driver using a PF driver as a proxy, for instance, to reduce or eliminate direct configuration of resources or configuration of the device from the enhanced VF. In exemplary embodiments, configuration of an adaptive VF driver may be proxied through a PF driver. In this manner, the PF can perform valid operations based on an underlying device and the adaptive VF driver may remain agnostic of the underlying hardware.

In some embodiments, the data plane and control plane may be separated out for the adaptive VF driver. Once that is achieved, preserving and budgeting for future expansion of the data path may be accounted for in the hardware direct access from the advanced VF driver. In various embodiments, control plane or the configuration path for adaptive VF drivers can be handled through an abstracted mailbox mechanism to a PF driver. With the mailbox mechanism, an adaptive VF driver may be configured for various needs, such as a simple network interface, or a trusted interface that can configure multiple filtering rules and can get access to programming other hardware resources. In some embodiments, policies for enabling VF features may be controlled or otherwise managed via the PF and the VMM or hypervisor (for instance, via a hypervisor administrator). In this manner, the adaptive VF driver still remains a dependent driver but can grow to expose an extremely powerful device depending on the policy enforced in the VMM or hypervisor.

Accordingly, in some embodiments, adaptive component hierarchy 305 may include a data and control plane layer 340. In one embodiment, an adaptive VF driver may have an operating environment that include data and control plane separation. As previously discussed, an adaptive VF driver may rely on a PF driver for any control plane or slow-path operations including, without limitation, configuration, resource allocation, reset, and/or the like. The control plane in an adaptive VF driver can be a hardware enabled software protocol between the adaptive VF driver and the PF driver (for example, a mailbox mechanism provided for communication between VF and PF in some network adapters) or a software control path managed by a virtual switch (e.g., a VM bus (VMBus) as provided by Microsoft® Hyper-V® for communication between a service client in the VM and the service provider in a host). The data plane may be implemented through the hardware so that the enhanced VF has direct fast-path access to the underlying hardware for DMA. For example, in a look-aside crypto implementation, security associations can be programmed through the control plane and data that needs to be encrypted is on the data plane and may be accessed via DMA directly from the VM.

An advanced feature set may include features in addition to the standard feature set. In some embodiments, features of the advanced feature set may be negotiated with the PF driver specific to the hardware. For example, an adaptive VF driver may enable promiscuous mode or support for RDMA upon negotiation with a PF driver. Accordingly, in some embodiments, adaptive component hierarchy 305 may include an advanced features access layer 350. In one embodiment, an adaptive VF driver may be operative to negotiate and proxy advanced features/capabilities. For example, in some embodiments, on initialization, an adaptive VF driver may initiate communication with a PF to request and/or query the resources available to it and the capabilities it can support. The adaptive VF driver may send down the capabilities it would like to enable. If the adaptive VF driver is an older version and the PF supports additional capabilities, then the adaptive VF driver still gets the standard feature set of capabilities that it requested. This allows the older adaptive VF driver to be able to run on a newer PF. If the adaptive VF driver is a newer driver and the underlying hardware can support only a subset of the capabilities the adaptive VF driver can support, the PF may only enable the standard feature set, thereby allowing the adaptive VF driver to run on the older PF and hardware.

In some embodiments, an adaptive VF driver may attempt to negotiate with a PF for advanced capabilities beyond the standard feature set that it can support. In this manner, if the PF is unable to support advanced capability, the adaptive VF driver can still continue to work with the standard feature set. If the PF can support the advanced features then the adaptive VF driver may selectively enable them.

An adaptive VF driver according to some embodiments, including adaptive component hierarchy 305, provides technological advantages compared to conventional VF drivers. For instance, an early iteration of an Intel® VF driver referred to as version "igbvf" provided no receive side scaling (RSS) or multi-queue support. With version "ixgbevf," the Intel® VF driver moved to support 2 queue RSS capability. With version "i40evf," the Intel® VF driver can scale up to 64 queues on "X722" devices. All the VF devices supported checksum and transmission control protocol (TCP) segmentation offload capability. With version "i40evf" came support of features for network function virtualization (NFV) and enablement to support remote direct memory access (RDMA) capabilities in the VF. Transmit (TX) checksum offload and TCP segmentation offload (TSO) for tunnels support were added both on "i40evf" and "ixgbevf" drivers. With these updates, new design patterns emerged with respect to VF drivers. Most advances were in the control plane, whereas the data plane can be kept fairly stable, although it has been scaling over generations. This led to separation of data plane and control plane capabilities. Further, it was recognized that as long as the data plane or "hotpath" access can be budgeted for future growth, the rest of the slow path configuration can be achieved through an indirect mechanism, for instance, via communication with the physical function (PF) driver.

In some embodiments, a particular implementation of an adaptive VF driver may have various design considerations. In one embodiment, for instance, an adaptive VF driver for SR-IOV enabled interfaces may include a dependent driver that negotiates advanced features with the corresponding PF driver. In order to achieve fast DMA, for example, and to get throughput comparable to that of the PF, direct memory access to device registers in the data path/hot path may be implemented. Other features may be determined via negotiation with the PF driver.

In some embodiments, hardware components may be operative to reserve only the data plane direct access and, for the rest, support a generic hardware mailbox (for example, to leave opportunity for expansion). In some embodiments, a virtual channel may be supported with capability negotiation between PF and VF driver on top of the hardware mailbox. This can be expanded with more capabilities depending on use-case and to preserve the base capabilities that all PFs and VFs must support such as single layer checksum, TSO, RSS, and/or the like.

As more and more features are added to the adaptive VF driver, regression testing may be performed to determine whether the VF can still work with the standard feature set. Accordingly, in some embodiments, the standard feature set (for example, a bare minimum feature set for what is needed during hot path access) may be implemented. Additional features may be be proxied through the PF driver. The PF driver may be queried by the adaptive VF driver responsive to various events, such as a setup change, a policy change, error condition, additional resource requirements (for example, the adaptive VF driver requires additional resources), and/or the like. If there is a flow or process that needs to be directed or dropped, the adaptive VF driver may query the PF to set it up. In this manner, the setup may be abstracted from the underlying device specific details and therefore makes the adaptive VF driver as substantially if not completely hardware agnostic.

In some embodiments, concise and/or expandable hotpath register definitions may be preserved over hardware generations. In various embodiments, the adaptive VF driver may use an abstracted hardware mailbox to the PF driver, for example, that can be built upon for extended capability negotiation. In one embodiment, a single expandable adaptive VF driver may be maintained. For instance, patches on the single expandable adaptive VF driver may be tested so as to not break forward or backward compatibility. Since the adaptive VF driver may be an expandable driver, it is likely that more features will be added in the future. As such, functionalities supported in one generation of silicon may not be supported on all hardware. Accordingly, embodiments provide processes for adaptive VF driver negotiation with the PF driver with respect to what can be enabled on a given device to avoid or completely eliminating breaking the base mode compatibility model for future devices.

Figure 4:
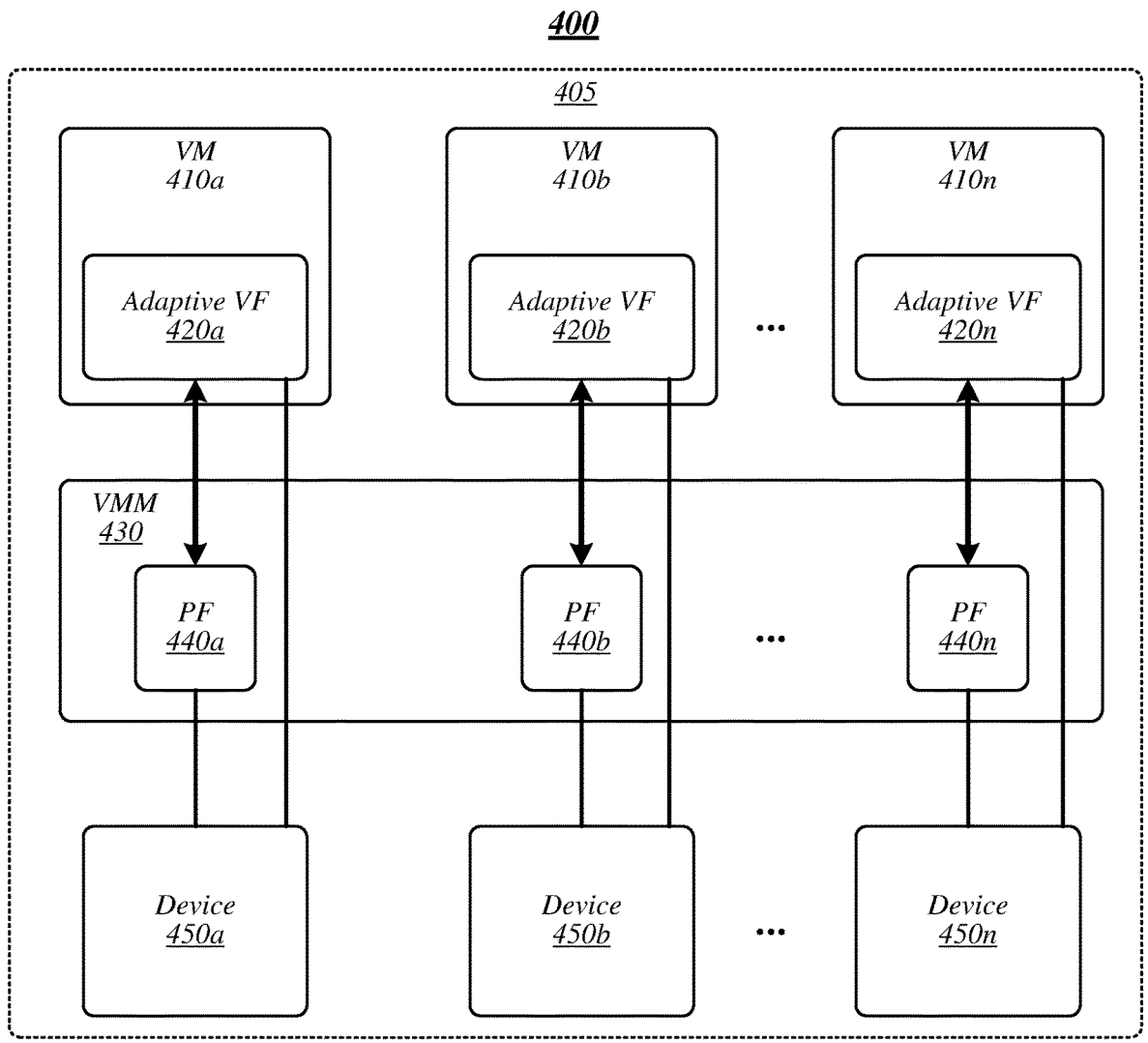
FIG. 4 illustrates an embodiment of a third operating environment.

FIG. 4 illustrates an example of an operating environment 400 that may be representative of some embodiments. In general, FIG. 4 may illustrates an example of use of single adaptive VF driver or a plurality of different VF drivers that can be used with various PF drivers that configure a different device (for example, different generations of a networking adapter) according to various embodiments. As shown in FIG. 4, operating environment 400 may include a virtualized computing environment implemented through apparatus 405. In some embodiments, apparatus 405 may include a single compute node. In other embodiments, apparatus 405 may include a plurality of compute nodes. Apparatus 405 may include VMs 410a-n, VMM (or hypervisor) 430, and devices 450a-n. In some embodiments, any of devices 450a-n may include various physical hardware components of apparatus 405, such as a networking device, I/O device, and/or the like. In some embodiments, devices 450a-n may include different hardware configurations, features, and/or the like. For example, one or more of devices 450a-n may include a different hardware generation of a same or similar device (for instance, a network interface controller (NIC)).

Each of VMs 410a, 410b, and 410n may be associated with adaptive VF (AVF) drivers 420a, 420b, and 420n to control devices 450a, 450b, and 450n, respectively. Although each VM 410a-n is depicted as being associated with a single AVF 420a-n, embodiments are not so limited, as VMs 410a-n may be associated with a plurality of AVFs 420a-n. VMM 430 may include a PF 440a, 440b, and 440n associated with a device 450a, 450b, and 450n, respectively. In some embodiments, each of AVFs 420a-n may operate with a plurality of VMs 410a-n, a plurality of PFs 440a-n, and/or a plurality of devices 450a-n. In this manner, time and cost overheads may be reduced for upgrading hardware components (for example, devices 450a-n) for VMs 410a-n.

In some embodiments, each of AVFs 420*a-n* may be the same AVF, for example, including the same or substantially the same hardware, software, logic, and/or the like for operating AVFs 420*a-n*. In other embodiments, at least a portion of AVFs 420*a-n* my include different AVFs, for example, that include different hardware, software, logic, and/or the like for operating AVFs 420*a-n*. In this manner, for example, AVFs 420*a-n* may be configured, selected, managed, or otherwise operated for specific devices 450*a-n*. In various embodiments, at least a portion of AVFs 420*a-n* may be configured, operated, and/or the like according to a two-driver model. In the two-driver model, a frozen feature VF base driver and a separate adaptive VF driver may be used that enables a trusted virtual function. In some embodiments, the two-driver model may be efficient, for example, for NFV environments.

Included herein are one or more logic flows representative of exemplary methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, hardware, or any combination thereof. In software and firmware embodiments, a logic flow may be implemented by computer executable instructions stored on a non-transitory computer readable medium or machine readable medium, such as an optical, magnetic or semiconductor storage. The embodiments are not limited in this context.

Figure 5:
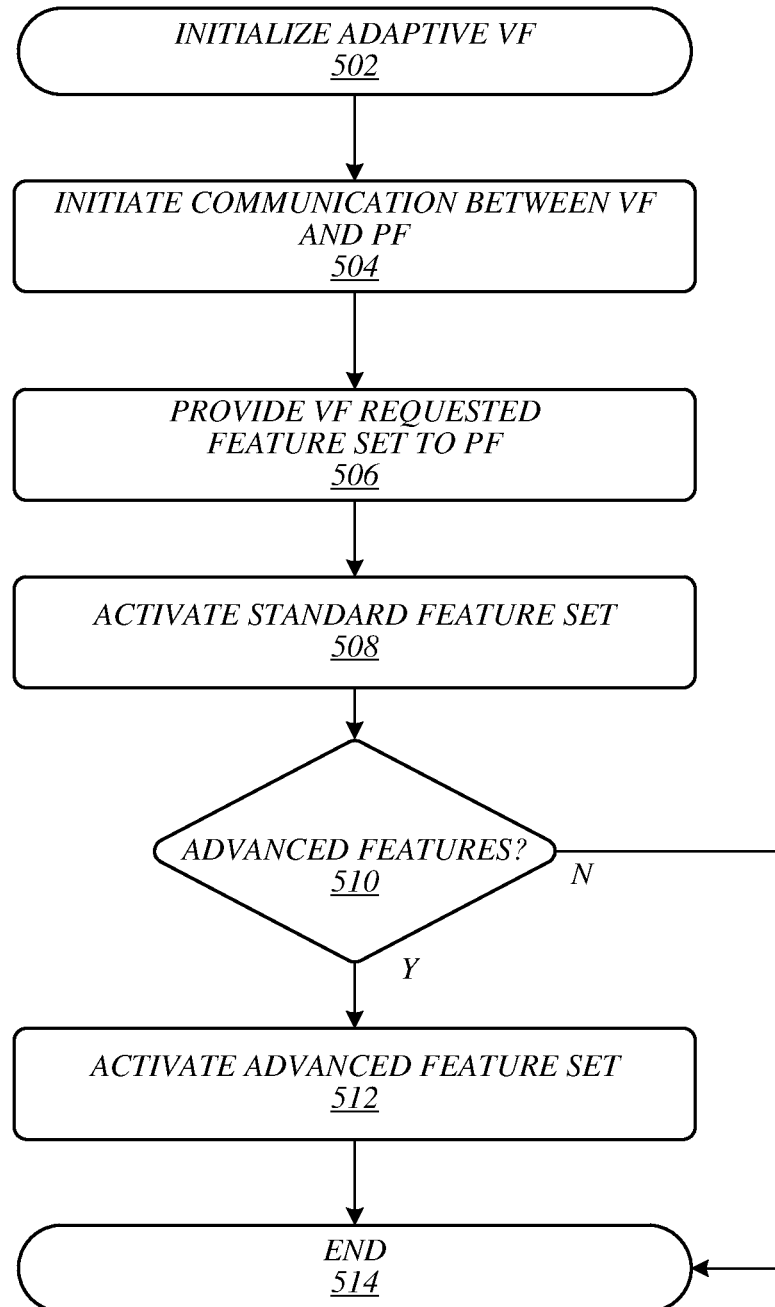
FIG. 5 depicts an illustrative logic flow according to a first embodiment.

FIG. 5 illustrates an embodiment of a logic flow 500. Logic flow 500 may be representative of some or all of the operations executed by one or more embodiments described herein, such as operating environments 100 and 200 and/or apparatus 405. In some embodiments, logic flow 500 may be representative of some or all of the operations of a performance analysis process.

At block 502, logic flow 500 may initialize adaptive VF. For example, VM 410*a* may initialize AVF 420*a* corresponding to functionality of device 450*a*. Logic flow 500 may initiate communication between the VF and a PF at block 504. For example, AVF 420*a* may initiate communication with PF 440*a*. In some embodiments, on initialization, an adaptive VF driver may initiate communication with a PF to request and/or query the resources available to it and the capabilities it can support. In various embodiments, adaptive VF driver may use a PF driver as a proxy, for instance, to reduce or eliminate direct configuration of resources or configuration of the device from the enhanced VF.

At block 506, logic flow 500 VF requested feature set is provided to the PF. For example, AVF 420*a* may provide PF 440*a* with a requested feature set of features that AVF 420*a* intends to enable. In some embodiments, the requested feature set may include features of a standard feature set and/or features of an advanced feature set. Logic flow 500 may activate a standard feature set at block 508. For example, AVF 420*a* may operate a standard (for instance, minimum or basic) feature set that is always available on hardware implementations. For example, an adaptive VF driver may preserve a defined standard feature set of functionality in a hardware device (for example, SR-IOV devices 230*a-n*) and in software for all virtual devices. In some embodiments, the standard feature set may include a minimum set of features that the adaptive VF driver may support.

At block 510, logic flow 500 may determine whether advanced features are to be activated. For example, an advanced feature set may include features in addition to the standard feature set. In some embodiments, features of the advanced feature set may be negotiated with the PF driver specific to the hardware. If advanced features are not to be activated, logic flow 500 may end at block 514 and the AVF may use the standard feature set. If advanced features are to be activated, logic flow may activate advanced feature set at block 512.

Figure 6:
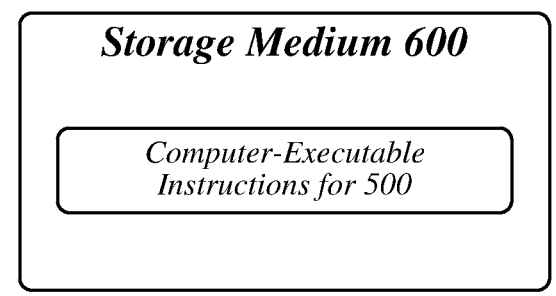
FIG. 6 illustrates an example of a storage medium.

FIG. 6 illustrates an example of a storage medium 600. Storage medium 600 may comprise an article of manufacture. In some examples, storage medium 600 may include any non-transitory computer readable medium or machine readable medium, such as an optical, magnetic or semiconductor storage. Storage medium 600 may store various types of computer executable instructions, such as instructions to implement logic flow 500. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
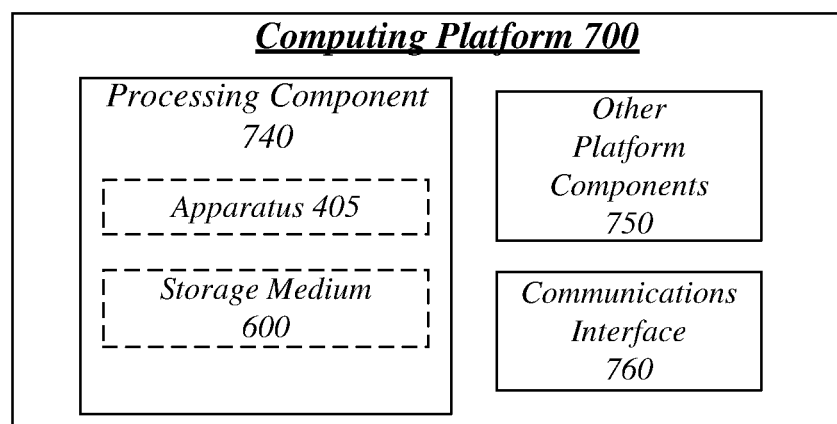
FIG. 7 illustrates an example computing platform.

FIG. 7 illustrates an example computing platform 700. In some examples, as shown in FIG. 7, computing platform 700 may include a processing component 740, other platform components or a communications interface 760. According to some examples, computing platform 700 may be implemented in a computing device such as a server in a system such as a data center. Embodiments are not limited in this context.

According to some examples, processing component 740 may execute processing operations or logic for operating environments 100 and 200, apparatus 405, and/or storage medium 600. Processing component 740 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), memory units, logic gates, registers, semiconductor devices, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 750 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), doubledata rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as redundant array of independent disks (RAID) drives, solid state memory devices (e.g., USB memory), solid state drives (SSD) and any other type of storage media suitable for storing information.

In some examples, communications interface 760 may include logic and/or features to support a communication interface. For these examples, communications interface 760 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the Institute of Electrical and Electronics Engineers (IEEE). For example, one such Ethernet standard may include IEEE 802.3-2012, carrier sense multiple access with collision detection (CSMA/CD) access method and physical layer specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture Specification").

Computing platform 700 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 700 described herein, may be included or omitted in various embodiments of computing platform 700, as suitably desired.

The components and features of computing platform 700 may be implemented using any combination of discrete circuitry, ASICs, logic gates and/or single chip architectures. Further, the features of computing platform 700 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 700 shown in the block diagram of FIG. 7 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, compact disk read only memory (CD-ROM), compact disk recordable (CD-R), compact disk rewriteable (CD-RW), optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following include non-limiting example embodiments:

Example 1 is an apparatus, comprising at least one memory, at least one processor, and logic to implement a virtual machine (VM), at least a portion of the logic comprised in hardware coupled to the at least one memory and the at least one processor, the logic to initialize an adaptive virtual function (VF) driver to facilitate communication between the VM and a physical device to be virtualized by a hypervisor operating on the apparatus, establish communication between the adaptive VF driver and a physical function (PF) driver of the hypervisor for the physical device, activate a standard feature set for the adaptive VF driver to execute on a PF of the physical device, and negotiate activation of an advanced feature set for the adaptive VF driver to execute on the PF, the adaptive VF driver to provide the advanced feature set to the PF, the PF to activate each feature of the advanced feature set supported by the PF.

Example 2 is the apparatus of Example 1, the standard feature set comprising a minimum set of features required for operation of the adaptive VF driver.

Example 3 is the apparatus of Example 1, the standard feature set comprising at least one of checksum offload, transmission control protocol (TCP) segmentation offload, multi-queue device interface, or receive side scaling.

Example 4 is the apparatus of Example 1, the PF driver operative as a proxy for the adaptive VF driver to configure the physical device.

Example 5 is the apparatus of Example 1, the PF driver to provide control plane functionality for the physical device to the adaptive VF driver.

Example 6 is the apparatus of Example 5, comprising a control plane comprising a software protocol between the adaptive VF driver and the PF driver.

Example 7 is the apparatus of Example 5, the control plane comprising a software control path managed by a virtual switch.

Example 8 is the apparatus of Example 1, the logic to disable each feature of the advanced feature set not supported by the PF.

Example 9 is the apparatus of Example 1, the logic to provide communication between the physical device and the PF via a hardware mailbox process.

Example 10 is the apparatus of Example 1, the logic to provide data communication between the adaptive VF driver and the physical device via direct memory access (DMA).

Example 11 is the apparatus of Example 1, the logic to provide data communication between the adaptive VF driver and the physical device via fast path registers.

Example 12 is a system, comprising the apparatus according to any of Examples 1-11, and at least one network interface.

Example 13 is a method to implement a virtual machine (VM), the method comprising initializing an adaptive virtual function (VF) driver to facilitate communication between the VM and a physical device to be virtualized by a hypervisor, establishing communication between the adaptive VF driver and a physical function (PF) driver of the hypervisor for the physical device, activating a standard feature set for the adaptive VF driver to execute on a PF of the physical device, and negotiating activation of an advanced feature set for the adaptive VF driver to execute on the PF, the adaptive VF driver to provide the advanced feature set to the PF, the PF to activate each feature of the advanced feature set supported by the PF.

Example 14 is the method of Example 13, the standard feature set comprising a minimum set of features required for operation of the adaptive VF driver.

Example 15 is the method of Example 13, the standard feature set comprising at least one of checksum offload, transmission control protocol (TCP) segmentation offload, multi-queue device interface, or receive side scaling.

Example 16 is the method of Example 13, the PF driver operative as a proxy for the adaptive VF driver to configure the physical device.

Example 17 is the method of Example 13, the PF driver to provide control plane functionality for the physical device to the adaptive VF driver.

Example 18 is the apparatus of Example 17, comprising a control plane comprising a software protocol between the adaptive VF driver and the PF driver.

Example 19 is the apparatus of Example 17, the control plane comprising a software control path managed by a virtual switch.

Example 20 is the method of Example 13, comprising disabling each feature of the advanced feature set not supported by the PF.

Example 21 is the method of Example 13, comprising providing communication between the physical device and the PF via a hardware mailbox process.

Example 22 is the method of Example 13, comprising providing data communication between the adaptive VF driver and the physical device via direct memory access (DMA).

Example 23 is the method of Example 13, comprising providing data communication between the adaptive VF driver and the physical device via fast path registers.

Example 24 is a non-transitory computer-readable storage medium that stores computer-executable instructions for execution by processing circuitry of a computing device, the computer-executable instructions, when executed, to cause the computing device to initialize an adaptive virtual function (VF) driver to facilitate communication between the VM and a physical device to be virtualized by a hypervisor operating on the computing device, establish communication between the adaptive VF driver and a physical function (PF) driver of the hypervisor for the physical device, activate a standard feature set for the adaptive VF driver to execute on a PF of the physical device, and negotiate activation of an advanced feature set for the adaptive VF driver to execute on the PF, the adaptive VF driver to provide the advanced feature set to the PF, the PF to activate each feature of the advanced feature set supported by the PF.

Example 25 is the non-transitory computer-readable storage medium of Example 24, the standard feature set comprising a minimum set of features required for operation of the adaptive VF driver.

Example 26 is the non-transitory computer-readable storage medium of Example 24, the standard feature set comprising at least one of checksum offload, transmission control protocol (TCP) segmentation offload, multi-queue device interface, or receive side scaling.

Example 27 is the non-transitory computer-readable storage medium of Example 24, the PF driver operative as a proxy for the adaptive VF driver to configure the physical device.

Example 28 is the non-transitory computer-readable storage medium of Example 24, the PF driver to provide control plane functionality for the physical device to the adaptive VF driver.

Example 29 is the non-transitory computer-readable storage medium of Example 28, comprising a control plane comprising a software protocol between the adaptive VF driver and the PF driver.

Example 30 is the non-transitory computer-readable storage medium of Example 28, the control plane comprising a software control path managed by a virtual switch.

Example 31 is the non-transitory computer-readable storage medium of Example 24, the computer-executable instructions, when executed, to cause the computing device to disable each feature of the advanced feature set not supported by the PF.

Example 32 is the non-transitory computer-readable storage medium of Example 24, the computer-executable instructions, when executed, to cause the computing device to provide communication between the physical device and the PF via a hardware mailbox process.

Example 33 is the non-transitory computer-readable storage medium of Example 24, the computer-executable instructions, when executed, to cause the computing device to provide data communication between the adaptive VF driver and the physical device via direct memory access (DMA).

Example 34 is the non-transitory computer-readable storage medium of Example 24, the computer-executable instructions, when executed, to cause the computing device to provide data communication between the adaptive VF driver and the physical device via fast path registers.

Example 35 is an apparatus, comprising a virtual function (VF) initialization means to initialize an adaptive VF driver to facilitate communication between the VM and a physical device to be virtualized by a hypervisor operating on the apparatus, a physical function (PF) control means to control operation of a PF driver associated with the physical device, a VF communication means to establish communication between the adaptive VF driver and a PF driver of the hypervisor for the physical device, and a VF feature activation means to activate a standard feature set for the adaptive VF driver to execute on a PF of the physical device, and negotiate activation of an advanced feature set for the adaptive VF driver to execute on the PF, the adaptive VF driver to provide the advanced feature set to the PF, the PF to activate each feature of the advanced feature set supported by the PF.

Example 36 is the apparatus of Example 35, the standard feature set comprising a minimum set of features required for operation of the adaptive VF driver.

Example 37 is the apparatus of Example 35, the standard feature set comprising at least one of checksum offload, transmission control protocol (TCP) segmentation offload, multi-queue device interface, or receive side scaling.

Example 38 is the apparatus of Example 35, the PF control means to operate the PF driver as a proxy for the adaptive VF driver to configure the physical device.

Example 39 is the apparatus of Example 35, the PF control means to operate the PF driver to provide control plane functionality for the physical device to the adaptive VF driver.

Example 38 is the apparatus of Example 35, the PF control means to operate the PF driver as a proxy for the adaptive VF driver to configure the physical device.

Example 39 is the apparatus of Example 35, the PF control means to operate the PF driver to provide control plane functionality for the physical device to the adaptive VF driver.

Example 40 is the apparatus of Example 39, comprising a control plane comprising a software protocol between the adaptive VF driver and the PF driver.

Example 41 is the apparatus of Example 39, the control plane comprising a software control path managed by a virtual switch.

Example 42 is the apparatus of Example 35, the VF feature activation means to disable each feature of the advanced feature set not supported by the PF.

Example 43 is the apparatus of Example 35, the VF communication means to provide communication between the physical device and the PF via a hardware mailbox process.

Example 44 is the apparatus of Example 35, the VF communication means to provide data communication between the adaptive VF driver and the physical device via direct memory access (DMA).

Example 45 is the apparatus of Example 35, the VF communication means to provide data communication between the adaptive VF driver and the physical device via fast path registers.

Example 46 is a system, comprising the apparatus according to any of examples 35-45, and at least one network interface.

Numerous specific details have been set forth herein to provide a thorough understanding of the embodiments. It will be understood by those skilled in the art, however, that the embodiments may be practiced without these specific details. In other instances, well-known operations, components, and circuits have not been described in detail so as not to obscure the embodiments. It can be appreciated that the specific structural and functional details disclosed herein may be representative and do not necessarily limit the scope of the embodiments.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
replacing, in a computing system, a first network interface controller (NIC) associated with a first virtual function (VF) driver with a second NIC associated with a second VF driver, the first VF driver providing access to a first set of capabilities of the first NIC, the second VF driver providing access to a first set of capabilities of the second NIC, the first set of capabilities of the second NIC comprising at least one capability not included in the first set of capabilities of the first NIC; and
interacting with the second NIC with the first VF driver.

2. The method of claim 1, wherein interacting with the second NIC with the first VF driver comprises interacting with the first set of capabilities of the second NIC with the first VF driver.

3. The method of claim 1, wherein the first set of capabilities of the first NIC are supported by a physical function (PF) driver of the first NIC, wherein the first set of capabilities of the second NIC are supported by a PF driver of the second NIC.

4. The method of claim 1, wherein the first set of capabilities of the first NIC are supported by the second NIC.

5. The method of claim 1, wherein interacting with the second NIC with the first VF driver is based at least in part on activating the first set of capabilities of the second NIC.

6. The method of claim 5, wherein the activation of the first set of capabilities of the second NIC is based at least in part on the first VF driver providing the first set of capabilities of the second NIC to a physical function (PF) driver of the second NIC.

7. The method of claim 1, wherein interacting with the second NIC with the first VF driver is based at least in part on disabling at least one capability not included in the first set of capabilities of the second NIC.

8. A method, comprising:
providing a first network interface controller (NIC) and a first virtual function (VF) driver, the first VF driver providing access to a first set of capabilities of the first NIC;
providing a second NIC and a second VF driver, the second VF driver providing access to a first set of capabilities of the second NIC, the first set of capabilities of the second NIC comprising at least one capability not included in the first set of capabilities of the first NIC; and
providing, by the second NIC, access to the first set of capabilities of the first NIC via the first VF driver.

9. The method of claim 8, further comprising:
providing, by the second NIC, access to the first set of capabilities of the second NIC via the first VF driver.

10. The method of claim 8, wherein the first set of capabilities of the first NIC are supported by a physical function (PF) driver of the first NIC, wherein the first set of capabilities of the second NIC are supported by a PF driver of the second NIC.

11. The method of claim 8, wherein the first set of capabilities of the first NIC are supported by the second NIC.

12. The method of claim 8, wherein the second NIC provides access to the first set of capabilities of the first NIC via the first VF driver based at least in part on the second NIC activating the first set of capabilities of the first NIC.

13. The method of claim 12, wherein the activation of the first set of capabilities of the first NIC is based at least in part on the first VF driver providing the first set of capabilities of the first NIC to a physical function (PF) driver of the second NIC.

14. A method, comprising:
providing a first network interface controller (NIC) and a first virtual function (VF) driver, the first VF driver providing access to a first set of capabilities of the first NIC;
providing a second NIC and a second VF driver, the second VF driver providing access to a first set of capabilities of the second NIC, the first set of capabilities of the second NIC comprising at least one capability not included in the first set of capabilities of the first NIC; and
providing, by the first NIC, access to the first set of capabilities of the first NIC via the second VF driver.

15. The method of claim 14, further comprising:
providing, by the second NIC, access to the first set of capabilities of the first NIC via the first VF driver.

16. The method of claim 14, wherein the first set of capabilities of the first NIC are supported by a physical function (PF) driver of the first NIC, wherein the first set of capabilities of the second NIC are supported by a PF driver of the second NIC.

17. The method of claim 14, wherein the first set of capabilities of the first NIC are supported by the second NIC.

18. The method of claim 14, wherein the first NIC provides access to the first set of capabilities of the first NIC via the second VF driver based at least in part on the first NIC activating the first set of capabilities of the first NIC.

19. The method of claim 18, wherein the activation of the first set of capabilities of the first NIC is based at least in part on the second VF driver providing the first set of capabilities of the first NIC to a physical function (PF) driver of the first NIC.

20. The method of claim 14, wherein providing the access to the first set of capabilities of the first NIC via the second VF driver is based at least in part on disabling at least one capability not included in the first set of capabilities of the first NIC, wherein the at least one capability not included in the first set of capabilities of the first NIC is included in the first set of capabilities of the second NIC.

* * * * *